April 22, 1958 — A. C. SAMPIETRO — 2,831,469
VALVE ROTATING DEVICE
Filed July 21, 1955 — 2 Sheets-Sheet 1

Inventor
ACHILLES C. SAMPIETRO

April 22, 1958 A. C. SAMPIETRO 2,831,469
VALVE ROTATING DEVICE
Filed July 21, 1955 2 Sheets-Sheet 2
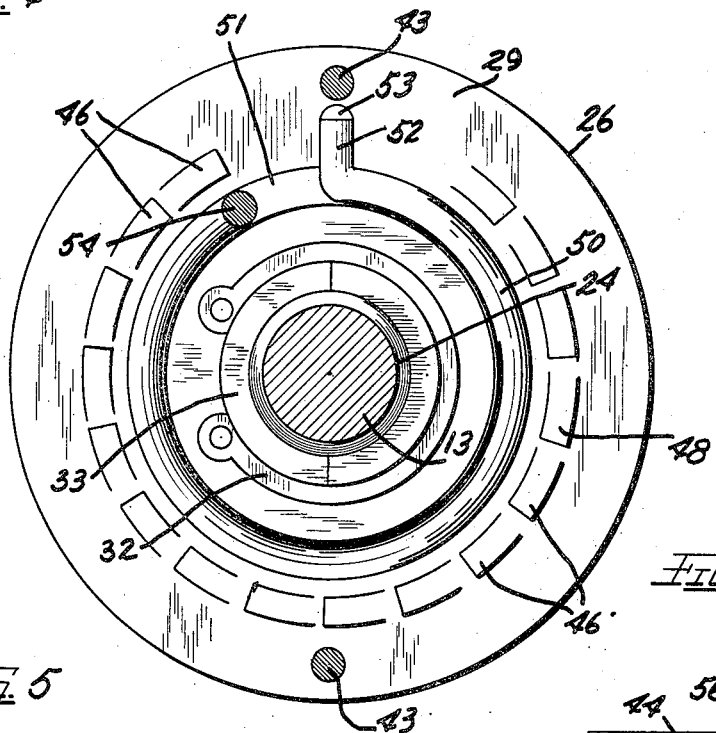
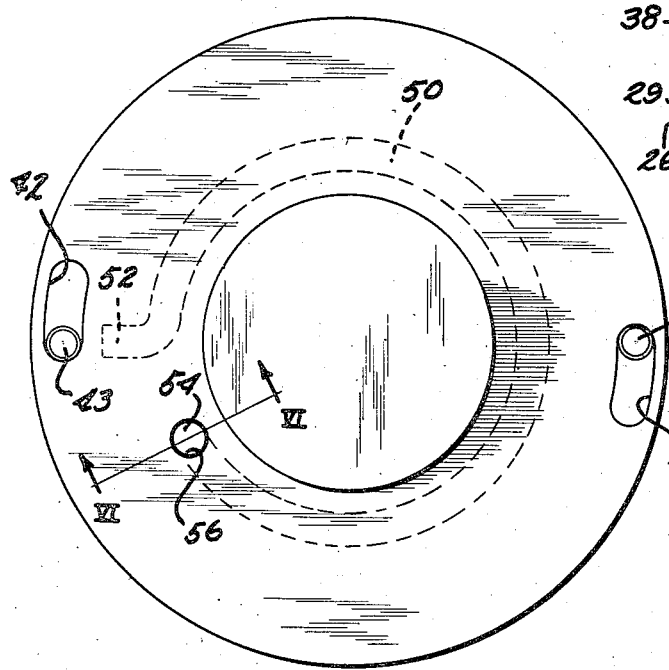
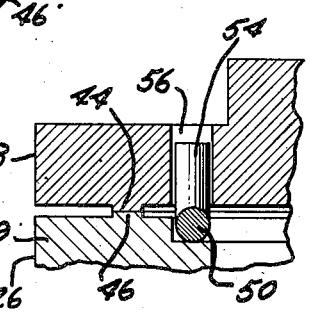
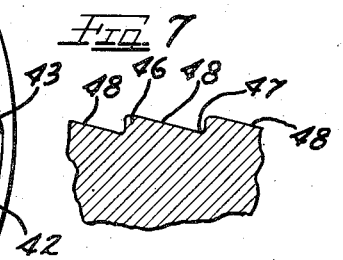
Inventor
ACHILLES C. SAMPIETRO

# United States Patent Office 2,831,469
Patented Apr. 22, 1958

2,831,469

VALVE ROTATING DEVICE

Achilles C. Sampietro, Ann Arbor, Mich., assignor to Thompson Products, Inc., Cleveland, Ohio, a corporation of Ohio Application July 21, 1955, Serial No. 523,525

10 Claims. (Cl. 123—90)

This invention relates generally to valve rotators and more particularly to a self-contained valve rotating device for automatically rotating a poppet valve as a function of the cyclic operation thereof.

Internal combustion engines are usually equipped with poppet valves and it has been found that the use of valve rotating devices to rotate the valves during engine operation causes the valves to continually seat in different angular relationship with respect to the cylinder head, thereby evening out any tendency towards carbon deposits and wear associated with particularly severe conditions at any portion of the valve or seat.

Rotation of a valve during engine operation is also desirable since the valve does not acquire a recurrent bending force in the same direction when a deposit occurs at a particular point on the valve seat. Accordingly, with the use of valve rotating devices, the valves operate in an efficient manner for a longer period of time and with greater efficiency than is otherwise possible.

In accordance with the principles of the present invention, inner and outer relatively rotatable valve parts are provided which are particularly characterized by the provision of intermeshing action surfaces inclined in such direction to rotatably drive the inner and outer parts for effecting incremental relative rotation upon cyclic operation of the parts.

More specifically, it is contemplated according to the principles of the present invention to provide a valve spring cap which is interconnected with the stem of a valve by retainer means affording relative axial movement between the valve spring cap and the stem and permitting the stem to rotate within the retainer means. There is further provided a driver member which is directly associated with the valve stem by means of a cone clutch and which is operatively associated with the valve spring cap by confronting portions particularly characterized by a plurality of action surfaces arranged in an annular row, each of the action surfaces being inclined to rotatably drive one part with respect to the other under increased axial load. The driver member and the valve spring cap are interrelated by pin and recess means to limit the amount of angular displacement therebetween. Thus, upon increased spring loading such as occurs when the valve is opened, the load will, in effect, be removed from the retainer ring and will be increased at the cone clutch so that relative movement at the action surfaces will rotatably drive the driver member together with the valve with respect to the valve spring cap member and the spring part associated therewith.

On the return stroke, the driver member is restored to its original position by a continuous biasing means taking the form of a torsion spring operatively interconnecting the driver member and the valve spring cap. Thus, valve inertia frees the cone clutch so that the driver member will rotatably return to its original position even though the valve does not rotate.

It is an object of the present invention to provide an improved valve rotating assembly.

Yet another object of the present invention is to provide a positive means of rotating engine valves which comprises a reduced number of simplified components which are convenient and economical to manufacture.

Another object of the present invention is to provide a self-contained valve rotating device which is small in size and which does not add excessive weight to a valve mechanism.

Many other features, advantages and additional objects of the present invention will become manifest to those versed in the art upon making reference to the detailed description which follows and the accompanying sheets of drawings in which a preferred structural embodiment of a valve rotating device incorporating the principles of the present invention is shown by way of illustrative example.

On the drawings:

Figure 4 is an enlarged fragmentary cross-sectional view with parts shown in elevation taken substantially on line IV—IV of Figure 1;

Figure 5 is a plan elevational view of the valve rotating device shown in Figures 1, 2 and 3;

Figure 6 is a fragmentary cross-sectional view taken substantially on line VI—VI of Figure 5; and Figure 7 is a fragmentary cross-sectional development illustrating the details of construction of the ratchet teeth and action surfaces provided between the parts of the valve construction provided in accordance with the principles of the present invention.

As shown on the drawings:

Figure 1:
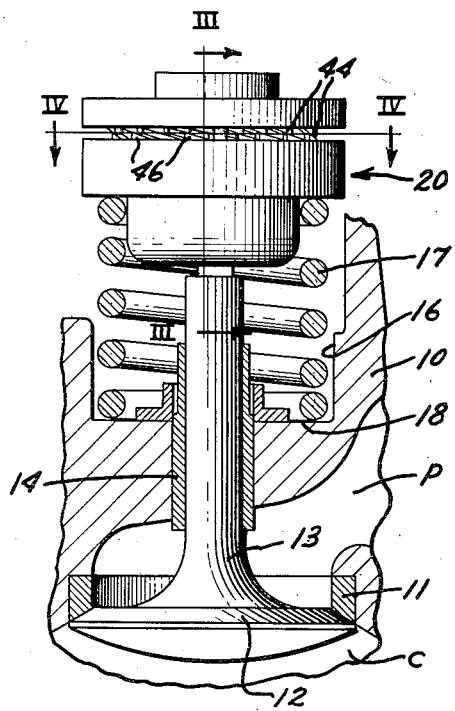
Figure 1 is a vertical cross-sectional view with parts shown in elevation of a poppet valve assembly equipped with a valve rotating device according to the principles of the present invention and showing the valve in closed position.
Figure 2:
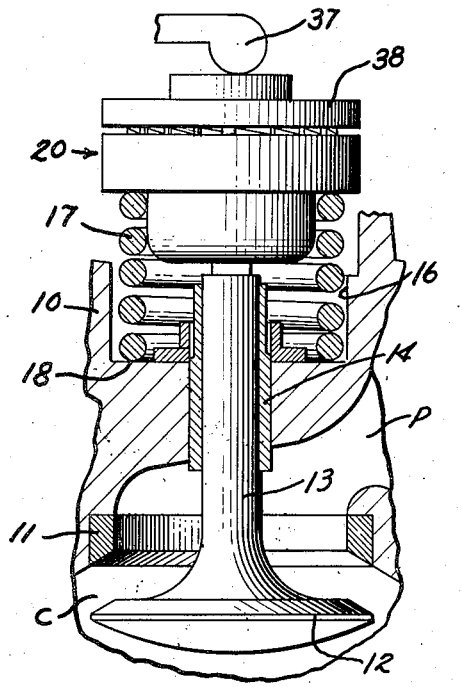
Figure 2 is a view similar to Figure 1 but illustrating the parts of the valve in open position.

In Figures 1 and 2, the reference numeral 10 indicates an engine part such as a portion of a cylinder head having a combustion chamber C and a port P, for example, an exhaust port. A seat ring 11 is secured in the mouth of the port P and has a beveled seating face facing the combustion chamber C for engaging correspondingly beveled seating face on a valve head 12 carried on one end of a valve stem 13 and provided to control the port P.

The stem 13 is slidably mounted in a stem guide 14 carried by the engine part 10 and extends into a recess 16 formed in the engine part 10.

A coil-type valve spring 17 has one end bottomed on a wall 18 at the bottom of the recess 16 and the opposite end of the valve spring 17 engages the valve rotating device of the present invention which is indicated generally by the reference numeral 20 and which is operatively connected to the valve stem 13 in order to rotate the valve in accordance with the cyclic operation thereof.

Figure 3:
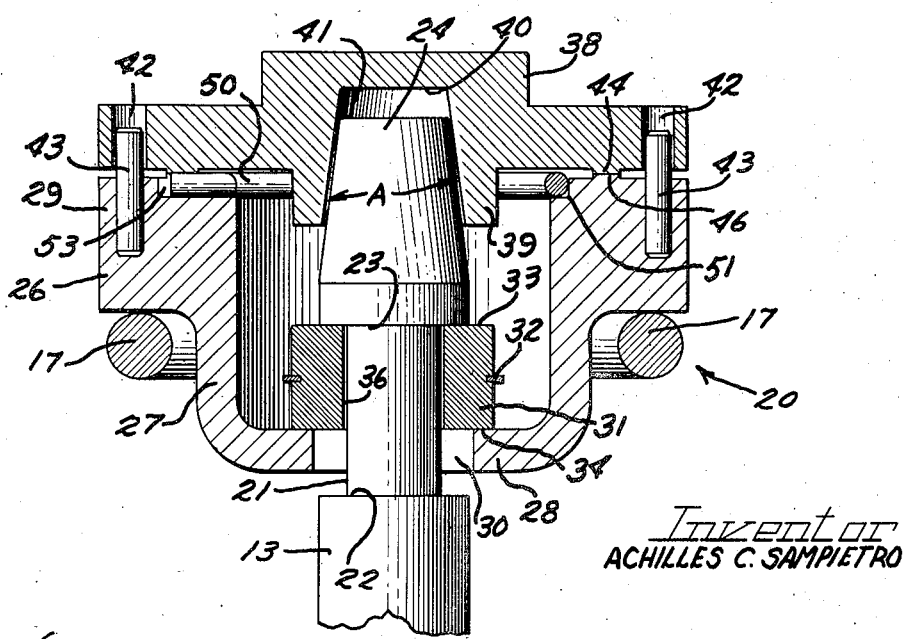
Figure 3 is a fragmentary cross-sectional view with parts shown in elevation taken substantially on line III—III of Figure 1.

Referring now more particularly to Figure 3, it will be noted that the valve stem 13 is particularly characterized by the formation therein of an elongated annular recess 21, the axial extent thereof being prescribed by a first radially extending shoulder 22 and a second radially extending shoulder 23.

The recess 21 is formed intermediate the ends of the valve stem 13 and preferably adjacent the tip end thereof. At the tip end of the valve stem 13 there is provided a tapered conical clutch surface 24. The conical walls of the clutch surface 24 are tapered at an angle indicated by A, which angle is preferably of an amount approximately equal to 10°.

In accordance with the principles of the present invention, one of the components of the valve rotating device 20 comprises a valve spring retaining cap 26 which can be considered as the outer part of an assembly constituting relatively rotatable inner and outer parts. The valve spring cap member 26 is generally cup-shaped in overall configuration and has generally cylindrical wall portions 27 extending parallel to the axis of the valve stem 13 inwardly flanged at one end as indicated at 28 and outwardly flanged at the opposite end as indicated at 29.

The flange 28 is particularly characterized by the formation therein of a centrally disposed opening 30 through which the valve stem 13 extends.

Received within the recess 21 is a retainer 31. In this form of the invention, the retainer 31 takes the form of annular ring means, for example, comprising a plurality of segments together forming a continuous ring and held in assembly by a snap ring 32. Thus, the retainer 31 is particularly characterized by the provision of axially spaced shoulders 33 and 34 separated by a spacing dimension less than the spacing dimension between the shoulders 22 and 23 at the ends of the recess 21 on the valve stem 13.

The retainer 31 is operatively interposed between the valve spring cap member 26 and the valve stem 13 so that the shoulder 33 engages the shoulder 23, while the shoulder 34 engages the valve spring cap member 26 at the edges of the opening 30 formed in the flange 28. It will be understood, therefore, that normal spring loading such as occurs because of the continuous biasing force exerted by the coil spring 17 will be transmitted to the valve stem 13 through the retainer 31.

As indicated at 36, there is sufficient clearance between the reduced diameter portion of the valve stem 13 at the recess 21 and the inner periphery of the retainer 31 so that the valve stem 13 will be relatively rotatable with respect to the retainer 31 if the parts are not otherwise restrained because of interengagement between the respective adjoining shoulders, for example, the shoulders 23, 33.

It will be understood that the valve is operated by the usual valve actuating mechanism, one part of which is shown in Figure 2 at 37, thereby to move the valve head 12 between the closed position of Figure 1 and the open position of Figure 2. It will be further appreciated, that when the valve is moved between open and closed positions, the entire valve assembly will be subjected to increased loading in an axial direction because of the compression of the valve spring 17.

According to the principles of the present invention, a separate driver member is utilized in connection with the actuating mechanism. In the illustrative form of the present disclosure by means of which the principles of the present invention are exemplified, the driver member is indicated at 38 and is interposed between the actuating part 37 and the end of the valve stem 13. Thus, the driver member 38 is, in effect, a cover of generally disk-shaped configuration. The driver member 38 is particularly characterized in this form of the invention by the provision of a centrally disposed enlarged boss 39 having formed therein an axially extending recess 40 having tapered side walls 41 forming a cone clutch surface complementary to the cone clutch surface 24 on the end of the valve stem 13 and operatively confronting the clutch surface 24.

The radially outwardly extending portions of the driving member 38 overlie the flange 29 of the valve spring cap member 26, thereby to form together with the flange 29 a pair of confronting portions which are relatively movable with respect to one another in a rotatable relation. Pin and recess means are provided between the confronting portions of the driver member 38 and the valve spring cap member 26 in order to limit the amount of angular displacement therebetween. For example, the driving member 38 has formed therein a pair of elongated arcuate slots 42 located in generally diametrically opposite portions of the driving member 38, and each receiving the end of a pin 43 carried in firm assembly by the flange 29 of the valve spring cap member 26.

The confronting portions of the driving member 38 and the valve spring cap member 26 are further characterized by the provision of an annular row of ratchet teeth formed therebetween, the teeth provided on the driving member 38 being indicated at 44 and the teeth on the valve spring cap member 26 being indicated at 46. Although it will be understood that the teeth 44 and 46 are generally similar insofar as structural detail is concerned, for the sake of clarity only one set of teeth is shown in the development of Figure 7. Thus, it will be noted that the teeth 46 are particularly characterized by the provision of alternate tooth projections and recesses 47, the area between the tooth projections and the bottom of the recesses 47 constituting an action surface 48 which is inclined at such an angle as to rotatably drive the adjoining parts whenever the ratchet teeth slidably engage one another and move between a full meshing engagement and an out of mesh position. In the illustrated form of the invention, the angle of inclination of the action surfaces 48 is approximately 8°.

In order to keep the adjoining parts in operative relation, a continuous biasing means is provided to exert a continuous biasing force tending to angularly align the driving member 38 and the valve spring cap member 26. In the present form of the invention, the biasing means takes the form of a circumferentially extending torsion spring 50. The torsion spring 50 conveniently encircles the boss 39 and is received in a notch or annular recess 51 formed at the inner edge of the flange 29 on the valve spring cap member 26. At one end of the torsion spring 50, an offset lug 52 is formed which is received in a recess 53 formed in the valve spring cap member 26. At the other end of the torsion spring 50, there is formed an offset lug 54 extending upwardly into a recess 56 formed in the driving member 38. Thus, the torsion spring 50 operatively interconnects the driving member 38 with the valve spring cap member 26. It will be understood that the recesses 53 and 56 can be angularly related to preload the torsion spring 50 so that the adjoining action surfaces 48 on the ratchet teeth 44 and 46 will be aligned as indicated in Figure 1 when the valve is closed.

In a typical operating cycle, the valve is moved from the closed position shown in Figure 1 to the open position shown in Figure 2 by the actuating means including the part 37 whereupon the drive member 38 exerts axial force against the valve spring cap member 26 as well as the stem 13 of the valve.

As shown in Figure 3 there is a slight clearance in the cone clutch between the clutch faces 24, 41. While the valve is closed and just as the drive member 38 starts to move, the drive member 38 is in contact with the valve spring cap member 26 through the teeth 44 and 46. The valve does not start to open until the clearance in the cone clutch is taken up. When the clearance, which might represent roughly the axial movement in the teeth, has been taken up, the contact at the faces 23, 33 and between the shoulder 34 and the upper surface of flange 28 is broken. The valve in any engine is accelerated from the closed position, so the accelerating force, or force to overcome inertia is exerted by the driving member 38 through the cone clutch. As the valve opens, increased valve spring force is exerted through the ratchet teeth 46 to the teeth 44 and slippage in the teeth at the angularly inclined action surfaces must thereby take place. This causes rotation of the driver member 38 and consequent rotation of the valve because of the semi-locking action of the cone clutch.

On closing, the valve must be accelerated from the open position by means of the valve spring 17. Because the valve spring 17 acts on the cap 26, the cap tends to move before the valve moves. Hence, the force that caused the clutch to lock is reversed and contact at the clutch is thereby broken. This causes the faces 33 and 34 of the lock 31 to engage with the face 23 and the upper surface of flange 28 respectively.

The bias spring 50 will cause repositioning of the driver member 38 when the various friction forces diminish to the value of the bias force. Thus, on the return stroke, the drive member 38 is restored to its original position by the torsional spring 50 since by valve inertia, there will be a freedom of movement between the cone surfaces 24 and 41 without a rotation of the valve stem 13 with respect to the valve spring cap member 26 and the spring 17. Each time the valve cycle is repeated, the components will be incrementally rotated to develop the advantageous features of the present invention.

There is provided in accordance with the principles of the present invention, therefor, a method of rotating axially adjacent relatively rotatable parts whereby the parts are cyclically loaded and unloaded with axially directed forces, the parts being restrained against rotation at minimum load by virtue of the engaging relationship between the abutment surfaces 23, 33. Furthermore, the restriction against rotation is removed by temporarily locking a driving member to one of the parts by an inertia induced clutching action. Greater than minimum loads are transmitted through angularly inclined action surfaces formed between the parts, thereby to produce slippage at the action surfaces for rotatably driving the parts with respect to one another.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. In a valve rotating device, a rotatable poppet valve, a valve spring cap, lost motion connecting means between said cap and said poppet valve, whereby the poppet valve and the valve spring cap are normally engaged at one end of the lost motion connection means, said valve having a driving means at one end thereof adapted to be engaged by a valve actuating means, and operatively confronting surfaces formed between said driving means and said valve spring cap inclined to rotatably drive the driving means, valve spring cap and valve under increased axial load.

2. A valve rotating device comprising, a valve spring cap member, a valve having a stem extending through said valve spring cap member, retainer means between said stem and said valve spring cap member prescribing limits of axial movement between said stem and cap members, while allowing said valve to rotate relative to said retainer means, a cover member on the end of said stem, said stem and said cover member having a cone clutch formed therebetween, pin and recess means between said cover member and said valve spring cap member prescribing limits of relative angular displacement between said cap and cover members, an annular row of intermeshing ratchet teeth between said cover and cap members, said cover member pressing against said cap member and stem under increased load to load said clutch and unload said retainer means, whereupon said clutch will drive said valve while said ratchet teeth rotatably drive said cover with respect to said cap member, and a torsion spring interconnecting said cover and cap members to restore said ratchet teeth to operative position, whereupon unloading of said cover member will unload said clutch and load said retaining means to return the cover member to original position without rotating said valve.

3. A device for effecting rotation between inner and outer parts, comprising, an inner part and an outer part having retainer means therebetween prescribing limits of relative axial movement between said parts while allowing relative rotation between the inner part and the retainer means, a driving part, means forming a cone clutch between said driving part and said inner part, retainer means between said driving part and said outer part prescribing limits of relative angular displacement between said driving part and said outer part, means forming action surfaces between said driving part and said outer part inclined to rotatably drive said driver part and said inner part with respect to one another under increased load when said clutch is loaded axially and said retainer means is unloaded, and a torsion spring operatively interconnecting said driver part and said outer part to return said driver part to original position without rotating said inner part.

4. In combination, a valve having a stem, the end of said stem having a tapered generally conical surface formed thereon, said stem having an annular recess spaced axially of said conical surface, a valve spring cap having an annular flange for seating a valve spring and having a centrally disposed opening through which said stem extends, a retainer of lesser axial length than said recess having axially spaced shoulders engaging said stem at one end of said recess and said valve spring cap at the edges of said opening, normal spring loading being transmitted through said retainer to said valve, a driver member having a conical surface operatively confronting said conical surface of said stem, said driver member and said valve spring cap providing first and second confronting portions particularly characterized by the formation thereon of an annular row of meshing teeth each having an action surface inclined in the direction of relative rotation between the driving member and the valve spring cap, pin and recess means between said confronting portions limiting the amount of angular displacement between the driving member and the valve spring cap, whereupon increased axial loading of said driving member upon opening of said valve will unload said retainer, thereby to rotatably drive said driving member and said valve stem through said clutch by the sliding of said action surfaces with respect to one another, and a continuous biasing means between said valve spring cap and said driving member to restore said driving member to original position when said clutch is unloaded and said retainer is reloaded.

5. The method of rotating a poppet valve which comprises transmitting normal spring load in one direction through a lost motion connection between a valve stem and a valve spring cap, transmitting a valve opening load in an opposite direction through a driving member having a cone clutch connection with the valve stem, thereby to substantially unload the lost motion connection while concurrently imparting a torque between the valve spring cap and the driving member by means of inclined action surfaces, thereby to rotate the valve with respect to the valve spring cap, and imparting a continuous torsional biasing force between the driving member and the cap to return the driving member to operative position under normal spring load on the valve.

6. A valve rotating device comprising, a valve having a stem, a valve spring cap adapted to bottom a valve spring, a lost motion connection between said valve spring cap and said valve stem to transmit normal spring load in one direction through said lost motion connection, a driving member, a cone clutch connecting said driving member to said valve stem, said driving member adapted to transmit a valve opening force in an opposite direction through said cone clutch to said valve stem, thereby to substantially unload said lost motion connection, and inclined action surfaces between said driving member and said valve spring cap to impart a torque between said valve spring cap and said driving member for rotating said valve with respect to said cap whenever said valve is opened, and a torsion spring operatively interconnecting said driving member and said valve spring cap to exert a continuous torsional biasing force between said driving member and said valve spring cap to return said driving member to operative position under normal spring load.

7. In combination, a valve, a driving member to impart axial thrust to said valve in one direction, clutching surfaces between said valve and said driving member having a slight clearance therebetween, a valve spring cap member, a coil spring engaging said valve spring cap member to impart an axial thrust to said valve in an opposite direction, a plurality of partially intermeshed ratchet teeth between said valve spring cap member and said driving member, connecting means providing engaging abutment faces between said valve and said valve spring cap for prescribing limits of relative axial movement therebetween and for restraining the valve spring cap member and the valve against relative rotation at normal spring loads, said valve being moved towards open position to take up said clearance between said clutching surfaces, whereupon engagement of said abutment faces is temporarily broken and accelerating force is exerted by said driving member through said clutching surfaces, thereby to transmit increased spring loading through said ratchet teeth, slippage of said ratchet teeth effecting relative rotation of the valve and driver member, said abutment surfaces being reengaged upon closing of the valve, and a torsional biasing means between said driving member and said valve spring cap member to reposition said driving member.

8. In combination, a valve, a driving member to impart axial thrust to said valve in one direction, clutching surfaces between said valve and said driving member having a slight clearance therebetween, a valve spring cap member, a coil spring engaging said valve spring cap member to impart an axial thrust to said valve in an opposite direction, inclined action surfaces between said valve spring cap member and said driving member, means to restrain said valve spring cap member and said valve against relative rotation at normal spring loads, said valve being moved towards open position to take up the clearance between said clutching surfaces, whereupon the restraint against relative rotation between said valve spring cap and said valve is temporarily broken, and accelerating force is exerted by said driving member through said clutching surfaces, thereby to transmit increased spring loading through said inclined action surfaces, slippage of said inclined action surfaces effecting relative rotation of the valve and driver member, said abutment surfaces being re-engaged upon closing of the valve, and a torsional biasing means between said driving member and said valve spring cap member to reposition said driving member.

9. A device for imparting rotation between axially loaded inner and outer parts comprising a driving member, said driving member and one of said parts having engaging angularly inclined action surfaces formed therebetween, means restraining the parts against rotation at minimum load, and clutching surfaces formed between said driving member and the other of said parts normally enjoying a clearance but engaged by inertia clutching action when said parts are subjected to increased axial load, thereby to remove the restriction against rotation between the parts while producing slippage between said action surfaces for rotatably driving the parts with respect to one another.

10. A device for imparting rotation between axially loaded inner and outer parts comprising a driving member, said driving member and one of said parts having engaging angularly inclined action surfaces formed therebetween, means restraining the parts against rotation at minimum load, and clutching surfaces formed between said driving member and the other of said parts normally enjoying a clearance but engaged by inertia clutching action when said parts are subjected to increased axial load, thereby to remove the restriction against rotation between the parts while producing slippage between said action surfaces for rotatably driving the parts with respect to one another, and torsional biasing means between said one part and said driving member to reposition said driving member.

References Cited in the file of this patent

UNITED STATES PATENTS

| | | |
|---|---|---|
| 1,414,499 | Buck | May 2, 1922 |
| 1,479,169 | Buck | Jan. 1, 1924 |
| 2,516,795 | Norton | July 25, 1950 |
| 2,674,985 | Carlin | Apr. 13, 1954 |
| 2,767,696 | Engemann | Oct. 23, 1956 |